(12) United States Patent
Lehtomaki et al.

(10) Patent No.: US 6,801,161 B2
(45) Date of Patent: Oct. 5, 2004

(54) SYSTEM AND METHOD FOR AUTO CALIBRATED REDUCED RANK ADAPTIVE PROCESSOR

(75) Inventors: Norman A. Lehtomaki, Edmonds, WA (US); Gregory A. Baker, Colorado Springs, CO (US); Dwight Divine, III, Rockville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/310,158

(22) Filed: Dec. 5, 2002

(65) Prior Publication Data

US 2003/0122710 A1 Jul. 3, 2003

Related U.S. Application Data

(60) Provisional application No. 60/335,800, filed on Dec. 5, 2001.

(51) Int. Cl.$^7$ ............................................... H01Q 3/00
(52) U.S. Cl. ...................................... 342/377; 342/383
(58) Field of Search ................................. 342/377–383

(56) References Cited

U.S. PATENT DOCUMENTS

| | | | | |
|---|---|---|---|---|
| 3,898,650 A | * | 8/1975 | Jensen ........................ | 342/190 |
| 5,742,591 A | | 4/1998 | Himayat et al. ............ | 370/286 |
| 5,924,980 A | | 7/1999 | Coetzee ...................... | 600/300 |
| 5,943,170 A | | 8/1999 | Inbar et al. ................. | 359/561 |
| 6,052,421 A | | 4/2000 | Richardson et al. ........ | 375/346 |
| 6,104,344 A | * | 8/2000 | Wax et al. ................... | 342/378 |
| 6,135,952 A | | 10/2000 | Coetzee ...................... | 600/336 |
| 6,232,918 B1 | * | 5/2001 | Wax et al. ................... | 342/378 |
| 6,598,014 B1 | * | 7/2003 | Rabideau et al. ........... | 342/378 |
| 2001/0011961 A1 | * | 8/2001 | Rexberg et al. ............. | 342/368 |

OTHER PUBLICATIONS

X.L. Xu et al., Reduced–dimension beam–space broad–band source localization: preprocessor design and evaluation, Fourth Annual ASSP Workshop on Spectrum Estimation and Modeling, p. 22–27, Aug. 1988.*

R. Hamza et al., Multiple cluster beamspace and resolution–enhanced ESPRIT, IEEE Transactions on Antennas and Propagation, vol. 42(8), p. 1041–1052, Aug. 1994.*

R.E. Mogensen et al., A hardware testbed for evaluation of adaptive antennas in GSM/UMTS, Seventh IEEE International Symposium on Personal, Indoor and Mobile Radio Communications, vol. 2, p. 540–544, Oct. 1996.*

K. Pensel et al., Calibration of smart antennas in a GSM network, 2nd IEEE Workshop on Signal Processing Advances in Wireless Communications, p. 354–357, May 1999.*

I. Jouny, Wavelet beamspace STAP for uniform linear arrays, Antennas and Propagation Society, IEEE International Symposium, vol. 1, p. 348–351, Jul. 1999.*

S. Kobayakawa et al., A blind calibration method for an adaptive array antenna in DS–CDMA systems using an MMSE algorithm IEEE 51$^{st}$ Vehicular Technology Conference Proceedings, vol. 1, p. 21–25, May 2000.*

(List continued on next page.)

Primary Examiner—Thomas H. Tarcza
Assistant Examiner—F H Mull
(74) Attorney, Agent, or Firm—Marsh Fischmann & Breyfogle LLP (57) ABSTRACT

The present invention describes a space-time adaptive processing (STAP) system and method combining adaptive processing with automatic phase calibration providing an improved signal-to-noise ratio of a received signal. The adaptive processing is accomplished by calculating a reduced rank approximation of a factorization of a covariance matrix via a partial singular value decomposition of the data matrix. According to the present invention, the calculation of a white noise gain constraint does not require knowledge or estimation of the noise floor. Automatic phase calibration using the signal data as the calibration source combined with the adaptive processing according to the present invention provides and enhance signal-to-noise ratio and clutter suppression.

19 Claims, 5 Drawing Sheets

OTHER PUBLICATIONS

K. Nishimori et al., Automatic calibration method using transmitting signals of an adaptive array for TDD systems, IEEE Transactions on Vehicular Technology, vol. 50(60), p. 1636–1640, Nov. 2001.*

International Search Report, dated Apr. 1, 2003, for Application No. PCT/US02/38614.

I.S. Reed, et al., Multidisciplinary Perspective On Adaptive Sensor Array Processing, IEEE Proceedings–Radar, Sonar and Navigation, Oct. 1999, vol. 146, No. 5, pp 221–234.

J.R. Guerci, et al., Optimal and Adaptive Reduced–Rank STAP, IEEE Transactions on Aerospace and Electronic Systems, vol. 36, No. 2, Apr. 2000, pp 647–663.

F.C. Robey, et al., Array Calibration and Modeling of Steering Vectors, IEEE, Nov. 2001, vol. 2, pp 1121–1126.

* cited by examiner

SYSTEM AND METHOD FOR AUTO CALIBRATED REDUCED RANK ADAPTIVE PROCESSOR

CROSS REFERENCE TO RELATED APPLICATIONS

This application claims benefit of U.S. Provisional Application No. 60/335,800 entitled "System and Method for Auto Calibrated Reduced Rank Adaptive Processor" and filed Dec. 5, 2001, which is hereby incorporated by reference.

BACKGROUND OF THE INVENTION

1. Field of the Invention

The present invention relates to a system and method for improving the signal-to-clutter ratio of electromagnetic signals received by an antenna array, and more particularly, to a system and method for improving the signal-to-clutter ratio of electromagnetic signals degraded by array calibration errors and multi-path interference.

2. Discussion of the Related Art

Various signal-processing techniques have been developed to process signal returns using antenna arrays. Efforts are generally made to reduce the interference received with the signal. Interference can include any electromagnetic energy that interferes with the desired signal, such as noise, clutter, and jamming. When a receiver is used in a moving environment, such as in an aircraft, environmental noise tends to be enhanced. Suppressing these undesirable signals has proven to be particularly challenging.

Space-time adaptive processing (STAP) is a particular signal processing technique designed to extract return signals from a target object by weighting a set of return signals from an antenna array to enhance the peaks in the direction of expected targets and generate nulls in the radiation pattern in the direction of noise or interference sources. Non-adaptive techniques use fixed weights, whereas adaptive techniques attempt to calculate weights based on the return signal set.

To calculate the adaptive weights, STAP techniques typically combine several pulse samples received by the array elements over a designated period of time. Generally, adaptive weights are calculated through the relationship $R\vec{w} = \vec{s}$, where $\vec{s}$ is the beam steering vector, R is the covariance matrix, and $\vec{w}$ is the weight vector. In order to identify the adaptive weights this relationship is simply manipulated to the following: $\vec{w} = R^{-1}\vec{s}$.

In a radar environment used to detect and track moving objects, the process of calculating and altering the weights must be done in real-time. STAP typically includes more adaptive parameters than can be estimated with a given amount of data in a non-stationary environment. There is simply insufficient data to accurately estimate these parameters to the accuracy necessary to provide a performance improvement over that obtainable with reduced degree of freedom processing. In addition, the processing required for full-degrees-of-freedom real-time processing is extremely difficult.

White noise gain constraints are popular methods for calculating adaptive weights when processing reduced rank calculations. Diagonal loading is the simplest form of a white noise gain constraint and is commonly used. Diagonal loading applies a quadratic constraint to restrain the effective increase in the background noise to allow suppression via deep nulls of highly anisotropic interference.

The basic optimization parameters for the adaptive weights are as follows:

$$\min_{w} w^H R w$$
$$\text{s.t. } w^H d = 1$$
$$w^H w \leq c$$

where
  w = the adaptive weight vector;
  d = the target object steering vector; and
  H = the Hermitian transpose.

Through a standard optimization the resulting adaptive weights can be calculated via diagonal loading of the covariance R. The weights are given by:

$$w = \frac{(R + \lambda I)^{-1} d}{(d^H (R + \lambda I))^{-1} d}$$

where λ is the smallest nonnegative number chosen to satisfy the quadratic white noise gain constraint $w^H w \leq c$. The value for c is adjusted to give the desired beamformer performance in terms of trading off the noise response versus the reduction of interference power. Often, instead of directly establishing a value for c, the resulting optimization works with an implied he value of λ that is typically chosen by estimating the noise floor and selecting λ to be in the range of −10 to +10 dB below or above the noise floor. When a value for c is explicitly given the solution for the Lagrange multiplier λ depends on the direction implicit in the steering vector d.

The use of a single value λ to calculate the quadratic white noise gain constraint is common, but not optimal. Additionally, estimation of the noise floor must be performed in order to locate the best white noise gain value by either choosing a value for c and solving explicitly for λ or by selecting λ explicitly.

Further complicating the signal processing, input signals received by an antenna array tend to show highly variable power histories indicative of constructive and destructive multipath interference. Signal cancellation occurs due to multipath, which is coherent with a main beam signal. This causes the weights to "hunt" excessively for short periods of integration. Longer integration periods reduce hunting, but slow reaction to changing interference environments. Furthermore, clutter suppression is degraded because array calibration errors raise sidelobe levels thereby mismatching the array steering vectors to the environment.

Additionally, these difficulties are present whether using a monostatic or bistatic system; however, a solution in the bistatic system is significantly more difficult to accomplish. For these and other reasons, obtaining improved clutter suppression from adaptive processing in a multipath environment is difficult.

These and other deficiencies exist in current adaptive processing systems. Therefore, a solution to these problems is needed providing a reduced rank adaptive processing system and method specifically designed to more accurately calculate the signals received by an antenna.

SUMMARY OF THE INVENTION

Accordingly, the present invention is directed to a system and method for providing calibrated, reduced rank adaptive processing. In particular, in the bistatic case, the present invention calibrates the signals received by the antenna array using the signals themselves as the calibration source, and adaptively processes the signals by calculating adaptive weights from a reduced rank approximation of the covariance matrix through a partial singular value decomposition.

In one embodiment, the invention comprises a signal processing system for adaptively processing signals received by an antenna array and organized into a data matrix that enhances the signal-to-noise ratio of the signals, comprising an antenna array, and a signal processor connected to the antenna array that includes a phase calibration element for correcting phase errors in the received signals using the received signals as the calibration source and an adaptive processing element for calculating adaptive weights from a reduced rank approximation of a factorization of a covariance matrix calculated from a partial singular value decomposition of the data matrix.

A further embodiment of the present invention comprises a method for processing received signals received by an antenna array for improving the signal-to-noise ratio of the received signals, comprising the steps of automatically calibrating the phase of the received signals to correct for phase errors, and adaptively processing the signals with reduced degrees of freedom.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to various embodiments of the present invention, examples of which are illustrated in the accompanying drawings.

Figure 1:
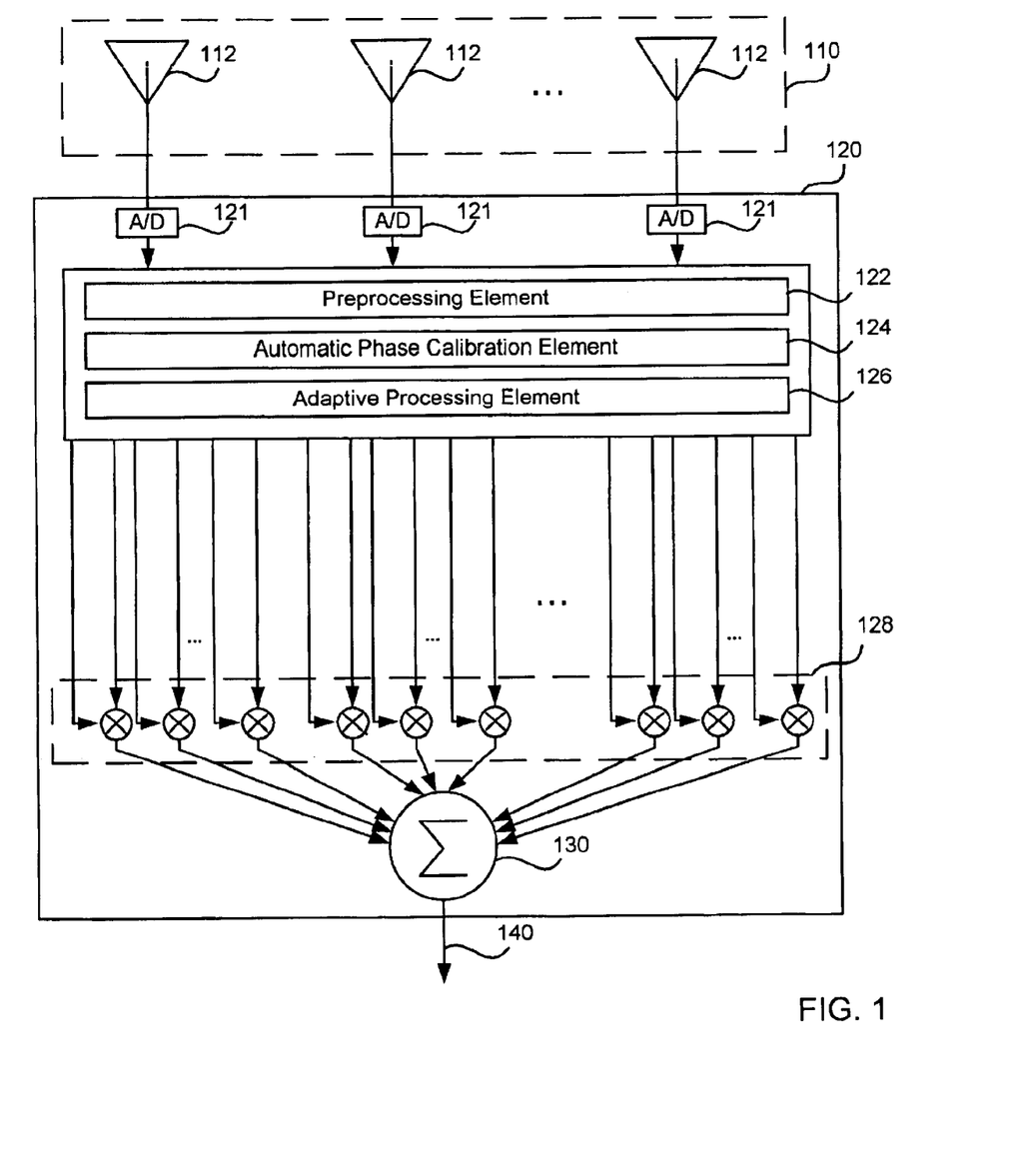
FIG. 1 shows a system for adaptively processing signals according to an embodiment of the present invention.

FIG. 1 shows a system 100 for adaptively processing signals according to an embodiment of the present invention. The system 100 includes an antenna array 110 and a signal processor 120 for adaptively processing signals. The antenna array 110 includes multiple array elements 112 for receiving the signals sent by the system 100 or some other signal generator used by the system 100 and reflected by a target object. As with all antennas, the antenna array 110 will also detect any other signal present in the vicinity of the system 100, including signals reflected by the surrounding environment, as well as other interfering signals, such as a jamming signal that may be present.

In one embodiment, one or more analog-to-digital converters 121 of the signal processor 120 are used to convert the signals received by the array elements 112 to a digital representation of the signals. The signal processor 120 of the embodiment of the present invention shown in FIG. 1 also includes a preprocessing element 122, an automatic phase calibration element 124, and an adaptive processing element 126.

According to an embodiment of the present invention, the signals received by the antenna array 110 are preprocessed by the preprocessing element 122. The preprocessing element 122 performs a down conversion to baseband and matched filtering (pulse compression) of the received signal pulses.

The automatic phase calibration element 124 phase calibrates the resulting set of array element signals. Phase calibration accounts for phase errors in the array elements 112, thereby correcting the signals to be adaptively processed. The present invention benefits by using the received signals for phase calibration.

In one embodiment, the phase calibration element 124 locates the delay bin of the direct blast of each array element signal and shifts the signals from each array element to time align the direct blast occurrence. Once the signals are time aligned, the phase calibration element 124 computes the differential phase across the array for each pulse. Median filtering across the pulses is used to eliminate any outlying signals. The average differential phase representing the direction of the plane wave arrival is subtracted. The resulting differential phase is due to any array phase errors. The resulting phase is then integrated across the array elements to produce a corrected phase for each element of the incoming data.

Further embodiments of the phase calibration element 124 may also estimate a secondary reflection from a target object as a secondary calibration source. It can also be appreciated that embodiments of the present invention may exclude phase calibration by bypassing the array calibration element 120, or eliminating it altogether.

The adaptive processing element 126 of an embodiment of the present invention adaptively processes the preprocessed and calibrated array element signals to enhance the signal-to-noise ratio for that set of received signals. One alternative embodiment provides for a reduction in beamspace prior to adaptively processing the signals. The signal data may be transformed by the adaptive processing element 126 to beamspace via conventional processing to identify localized areas of significant energy and develop a reduced beam set for adaptive processing. A further alternative embodiment provides for reduction in the degrees of freedom in element space.

Thus, the reduction of degrees of freedom may be accomplished in one of two distinct manners: 1) the reduction to beamspace and allocating a reduced beam set as the input to the adaptive processing or 2) the reduction of degrees of freedom in element space by using only a fraction of the singular values and singular vectors of the data matrix. After the target object steering vectors are defined, adaptive processing proceeds identically whether in element space or beamspace.

The adaptive processing of the present invention is accomplished by calculating a reduced rank approximation of a factorization of the sample covariance matrix $\hat{R}$ via a partial singular value decomposition of the data matrix formed by combining K data snapshots. Each snapshot consists of signal returns over a preset period of time for a specified number of pulses.

The adaptive processing element 126 formulates adaptive weights by calculating a beam dependent white noise gain constraint based on the calculation of the covariance matrix R and the steering vector d. According to the present invention, calculation of the beam dependent white noise gain constraint does not require knowledge of the noise floor, thus, removing any necessary calculations to estimate the noise floor. The constant c, the white noise gain constraint, is selected as $$c = \frac{\beta}{d^H d} \text{ with } \beta = 10^{\frac{\delta}{10}}$$

and where δ is typically selected as a number ranging from 3 to 6. This allows an increase of 3 to 6 dB over the white noise level at the conventional unshaded, beamformed output providing a 3 to 6 dB degradation of the white noise suppression ability of the beamformer. The present invention uses an analytical model for the noise floor, removing the need to estimate the noise floor, which can be problematic. Once the beam dependent white noise gain constraints are calculated for the beam set, they are applied to the received signals by multipliers 128 and the summing element 130 of the adaptive processor 120 sums the resulting signals to create a single output signal 140 for the combined beam sets.

Combining array calibration with adaptive processing enhances the ability of the present invention to improve signal gain, and nullify noise, including the effects of calibration errors and multipath interference. Furthermore, preprocessing reduces the overall processing load allowing for increased efficiency in locating signal returns of target objects among the clutter of environmental noise and jamming. Although applicable in both a monostatic and bistatic environment, the present invention is particularly beneficial in providing a solution in the bistatic environment.

Figure 2:
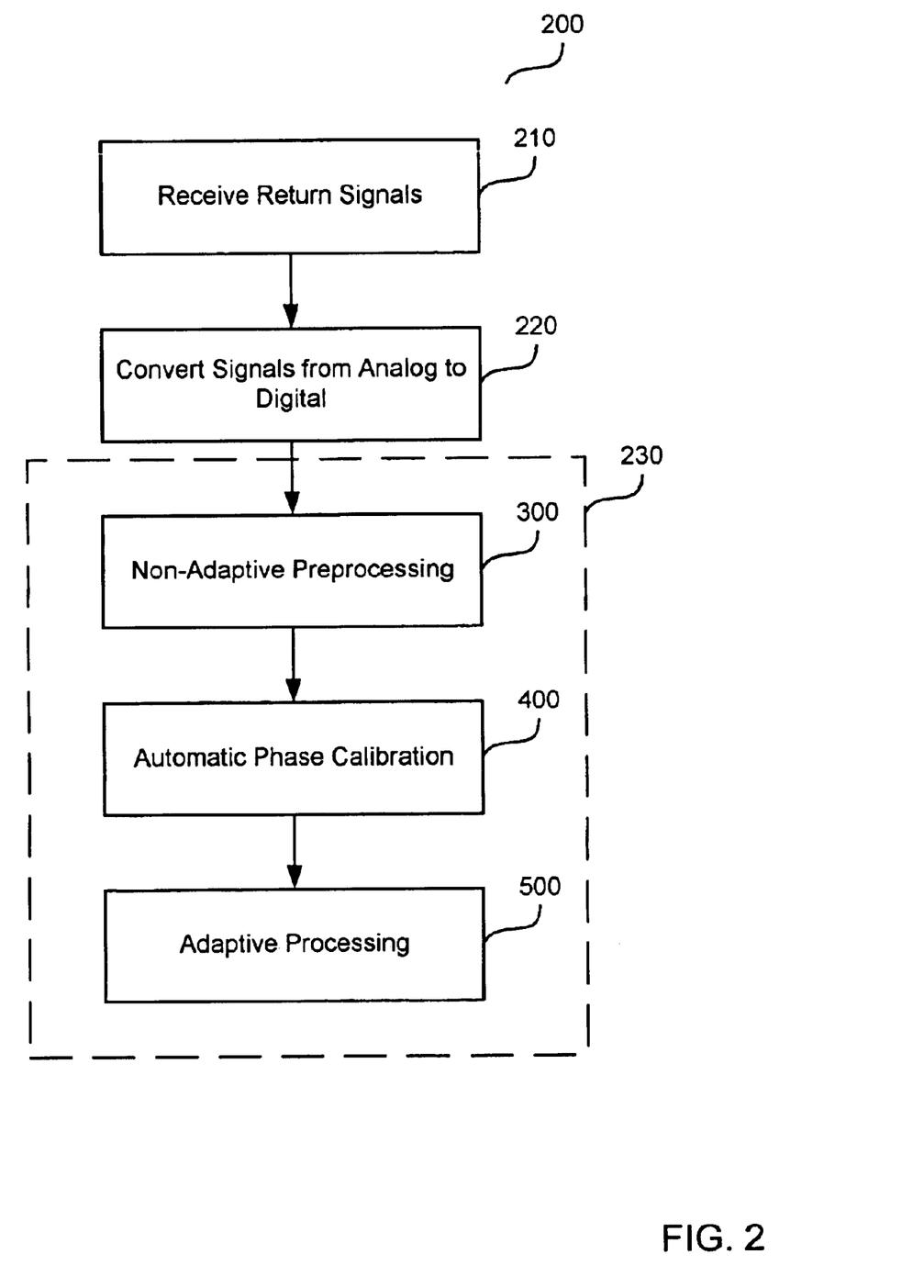
FIG. 2 is a flow diagram showing the process flow for adaptive signal processing according to an embodiment of the present invention.

FIG. 2 is a flow diagram 200 showing the general signal processing flow according to the present invention. In particular, the process is initiated when an antenna array receives signals in Step 210. The received signals are converted from digital to analog in Step 220. Digital signal processing 230 processes the digital signals to achieve a single signal with an enhanced signal-to-noise ratio.

In one embodiment of the present invention, the digital signal processing step 230 includes a preprocessing step 300, followed by an automatic phase calibration step 400, and an adaptive processing step 500. The non-adaptive preprocessing step 300 performs matched filtering or pulse compression of the received pulses to increase the signal-to-noise ratio and enhance the resolution in range. The automatic calibration step 400 corrects phase errors associated with the antenna array elements. Adaptive processing step 500 adaptively processes the signals, which may include steps to reduce dimension. In one embodiment, the adaptive processing step 500 utilizes the element space data and then generates white noise gain constraints to be applied to the signals. In an alternative embodiment adaptive processing step 500 transforms the data from element space to beamspace to localize energy in a reduced beam set and then generates white noise gain constraints to be applied to the signals. Whether in beamspace or element space the white noise gain contraints are generated in the same manner. The combination of automatic phase calibration and adaptive processing of the present invention provides an improved signal-to-noise ratio achieving enhanced signal gain and high performance nulling of signal interferences.

Figure 3:
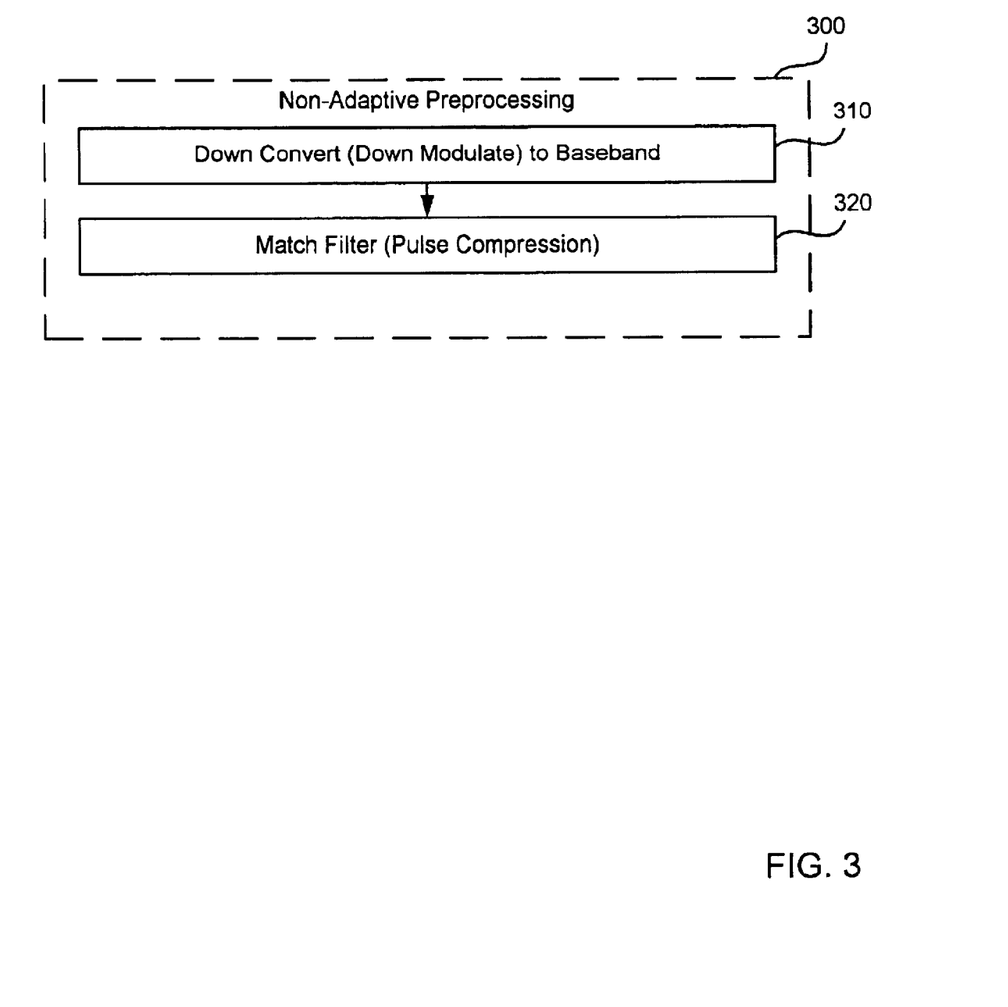
FIG. 3 shows the process of non-adaptive preprocessing according to an embodiment of the present invention.

FIG. 3 describes the non-adaptive preprocessing step 300 in greater detail. During preprocessing, the received signals are down converted or down modulated to baseband in step 310 and each baseband pulse is matched filtered or pulse compressed in step 320 with a replica of the baseband version of the transmitted pulse. Preprocessing in this manner increases the signal-to-noise ratio and provides greatly enhanced resolution in the range dimension.

Figure 4:
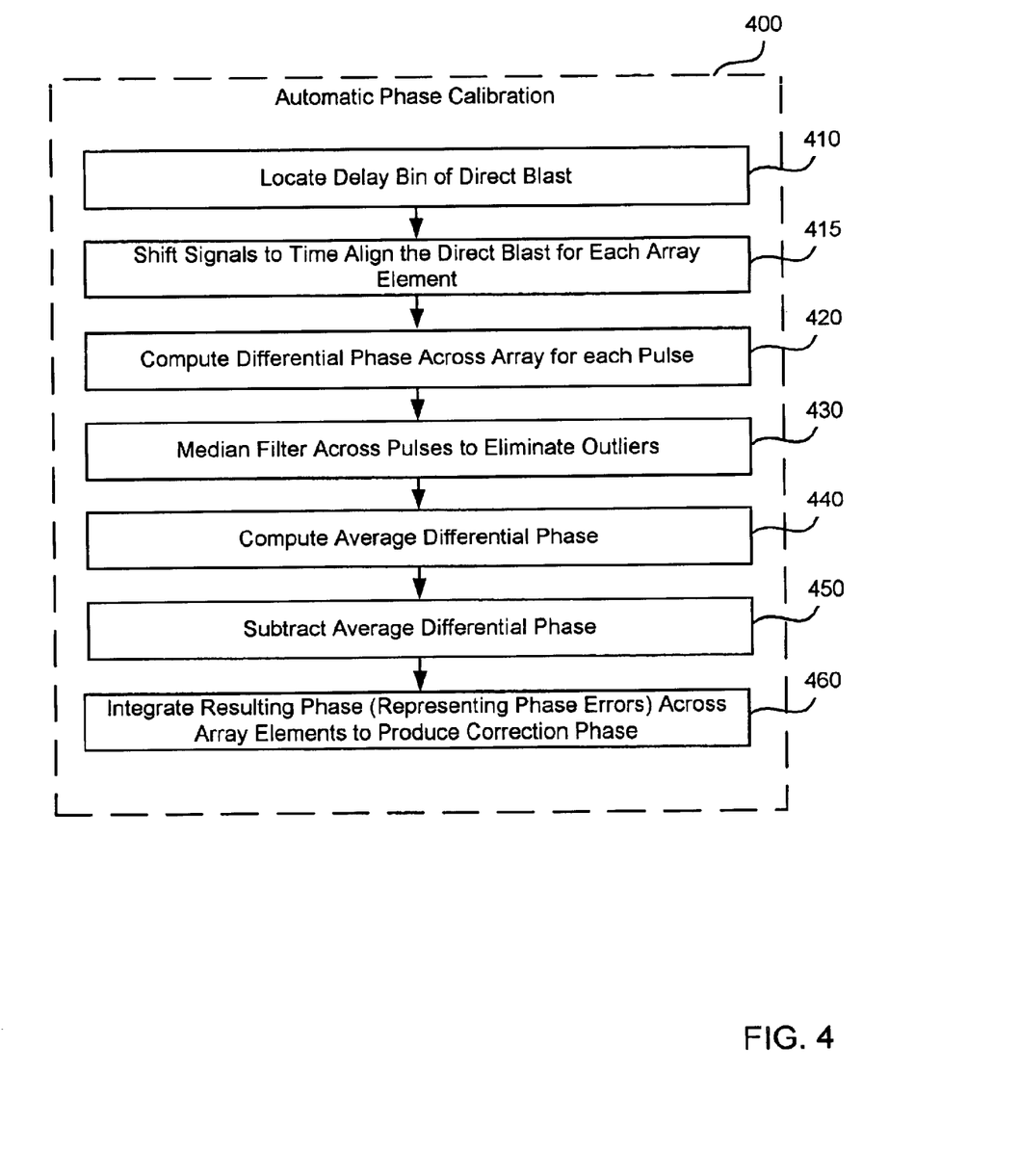
FIG. 4 shows the process of automatic phase calibration according to an embodiment of the present invention.

FIG. 4 describes the automatic phase calibration of Step 400 in greater detail. Automatic phase calibration in combination with the adaptive processing of Step 500 shown in FIG. 2 enhances the white noise gain constraint's effectiveness by improving the ability to nullify the effects of coherent multipath and phase errors. Additionally, phase calibration ensures that the array elements have roughly the same power and constant differential phase, providing a way to examine the signals to determine if the signal data is corrupt.

Turning to FIG. 4, in the automatic phase calibration step 400, the process begins in Step 410 where the range bin containing the direct blast of localized energy is located and used as a calibration source. The signals of the array elements are shifted in Step 415 to time align the direct blast occurrence. The direct blast represents a plane wave arriving from a specific direction. This implies a constant differential phase across the array elements. Deviations from this constant differential phase indicate phase errors in the antenna array.

Next, a differential phase across the array for each pulse is computed in Step 420. Median filtering across pulses is then used to eliminate any outliers in Step 430. The average differential phase representing the direction of the plane wave arrival is calculated in Step 440 and subtracted in Step 450 resulting in a differential phase that is due to the array phase errors. This phase is then integrated across the array elements to produce a correction phase for each element of the incoming data in Step 460.

Figure 5:
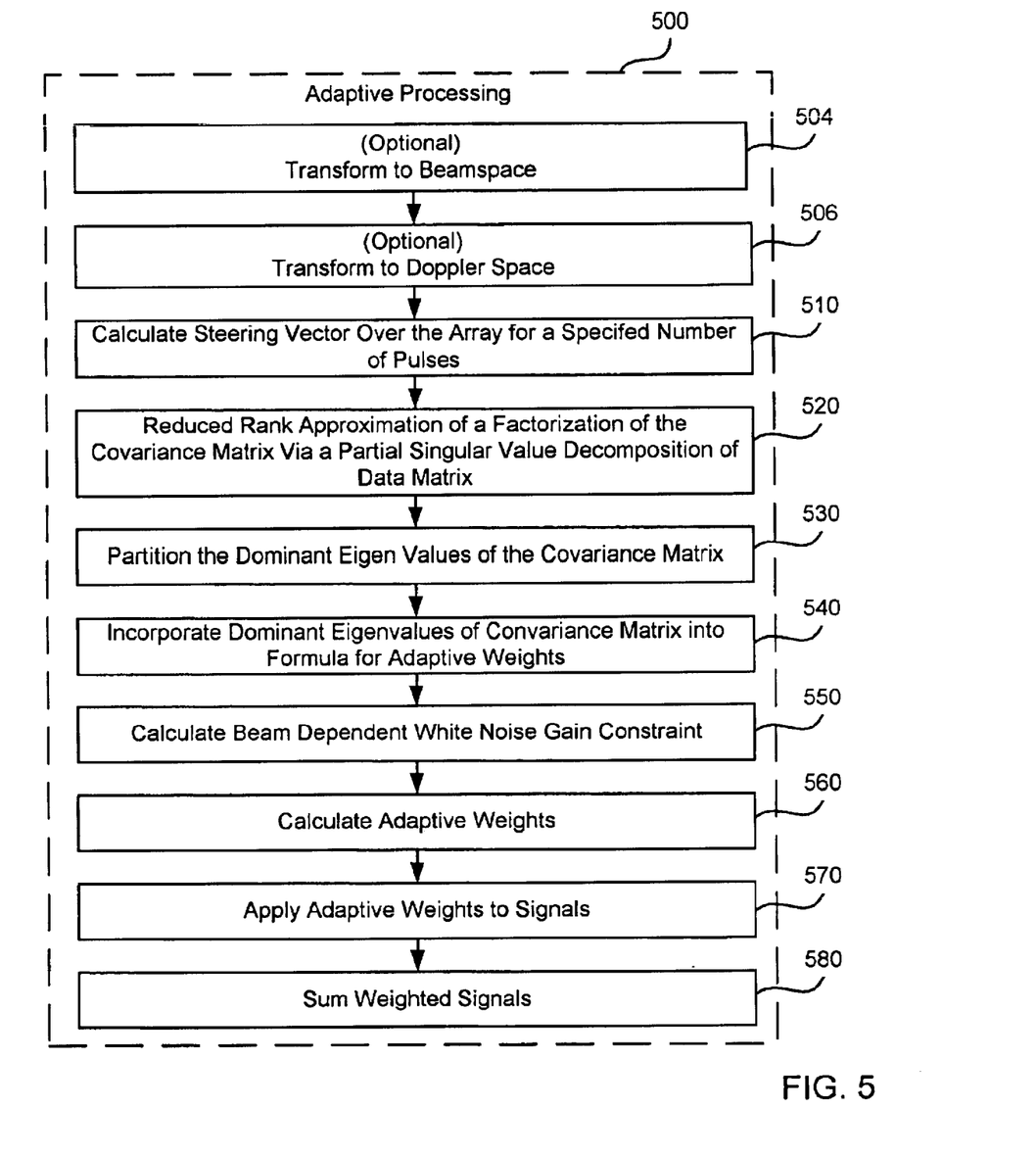
FIG. 5 shows the process of adaptive processing according to an embodiment of the present invention.

FIG. 5 describes the adaptive processing of Step 500 in greater detail. The adaptive processing step 500 of the present invention improves the stability of the implied covariance estimate and the adaptive weights and sidelobe levels calculated from it by utilizing a reduced rank approximation of a factorization of the covariance matrix and by eliminating the need to use an estimated noise floor. Additionally, the automatic phase calibration step 400 shown in FIG. 2 in combination with the adaptive processing step 500 enhances the clutter suppression achieved by the present invention by improving the effectiveness of nullifying the effects of multipath signals and phase errors.

As described earlier, adaptive weights are based on the equation $$w = \frac{(R + \lambda I)^{-1} d}{(d^H (R + \lambda I))^{-1} d}$$

where $\lambda$ is calculated using $\beta$ and $\delta$. The target model for the complex baseband matched filtered data can be expressed as:

$$x_n(t) = As(t-\tau_n)e^{-j(\omega_0+\omega_d)\tau_n} \approx As(t-\tau_0)e^{-j(\omega_0+\omega_d)\tau_n} \approx \tilde{A}s(t-\tau_0)e^{-j(\omega_0\delta\tau_n+\omega_d\tau_0)}$$

where $x_n(t)$ = the $n^{th}$ element signal, $s(t)$ = the compressed pulse, $A$ = its complex amplitude, $\tau_n$ = the time delay for the $n^{th}$ element, $\omega_0$ = the center frequency of the pulse, and $\omega_d$ = the target Doppler frequency.

The time delay $\tau_n$ can be broken up into a bulk delay common to all elements, $\tau_0$, which can be absorbed into the complex scalar A to produce $\tilde{A}$, and $\delta\tau_n$ the differential time delay relative to a reference element. Since $\tilde{A}s(t-\tau_0) \equiv \alpha(\tau_0)$ has support only near $t+\tau_0$, this delay represents the target range so that $x_n(t)$, represents the reflections from all targets and clutter within the time period $t \in [0, T]$ associated with one pulse. For multiple pulses corresponding to a single range $\tau_0 = \tau_t + mT$ where $\tau_t$ is the time delay for the target for the first pulse. Hence the model for the target becomes:

$$x_{nm}(t) + \alpha(t)e^{-j(\omega_0\delta\tau_n + m\omega_d T)}.$$

The differential spatial time delay $\delta\tau_n$ for a linear array with spacing $\Delta$ between elements is given by $$\omega_0\delta\tau_n = -\frac{2\pi\Delta(n-1)}{\lambda}\sin(\theta) = (n-1)v\Delta$$

where $\theta$ is the angle from array broadside (i.e., the complement of the cone angle). This produces the snapshot $x_t$:

$$x_t = \begin{bmatrix} x_{11}(t) \\ x_{21}(t) \\ \vdots \\ x_{12}(t) \\ x_{22}(t) \\ \vdots \\ x_{nm}(t) \end{bmatrix}$$

where is x is associated with time t. Time t correlates to range or bistatic range where $n=1,2,\ldots,N$ for N elements and $m=1,2,\ldots,M$ for M pulses.

Turning to FIG. 5, in one embodiment of the present invention, Step 504 may optionally transform signal data to beamspace via conventional processing to identify localized areas of significant energy and develop a reduced beam set. In a further embodiment of the present invention, Step 506 may optionally transform signal data to Doppler space.

The steering vector associated with a target object is calculated in Step 510 as:

$$d(\omega, v) = b(\omega) \otimes a(v)$$

where $$b(\omega) = \begin{bmatrix} 1 \\ e^{-j\omega T} \\ \vdots \\ e^{-j(M-1)\omega T} \end{bmatrix}, \text{ and}$$

$$a(v) = \begin{bmatrix} 1 \\ e^{-jv\Delta} \\ \vdots \\ e^{-j(N-1)v\Delta} \end{bmatrix}.$$

In a post Doppler adaptive beamformer embodiment of the present invention a nonadaptive transformation to Doppler space in step 506 is effected with a fast Fourier transform (FFT) over a number of pulses and a great reduction in dimension is achieved with attendent computational savings. This reduces the steering vector to $$d = a(v) = a\left(\frac{\omega\sin\theta}{c}\right)$$

where a new steering vector set is computed for all angles for each new Doppler frequency $\omega$ and the STAP problem is reduced to M post Doppler adaptive beamforming problems of dimension N.

A reduced rank approximation of R is then accomplished via a partial singular value decomposition of the data matrix X given in Step 520 by:

$$X = [x_1 \ x_2 \ \cdots \ x_K] = U\sum V^H = U\begin{bmatrix} \sum_s \\ 0 \end{bmatrix}V^H$$

when $K < dim(d)$ and where $$x_t = x_{t|t=(t-1)\Delta t}.$$

This decomposition provides the estimate of the eigen decomposition of R as:

$$\hat{R} = \frac{1}{K}XX^H = \frac{1}{K}U\sum\sum^T U^H.$$

The process then moves to Step 530 where partitioning the dominant eigenvalues of $\hat{R}$ produces:

$$\Lambda = \sum\sum^T = \begin{bmatrix} \Lambda_s & 0 \\ 0 & 0 \end{bmatrix}.$$

Then, the adaptive weights are formulated with these dominant eigenvalues in Step 540 to produce:

$$w = \frac{(U(\Lambda + \lambda I))^{-1}U^H d}{d^H U(\Lambda + \lambda I)^{-1}U^H d} = \frac{U(\Lambda + \lambda I)^{-1}z}{z^H U(\Lambda + \lambda I)^{-1}z}; \ z = U^H d.$$

Using the unitary properties of U and using the notation $u_i$ for the $i^{th}$ column of U, the first p columns associated with the nonzero singular values of X provide the solution for the weights w in Step 560 as:

$$w = \frac{d - \sum_{i=1}^{p} \frac{\lambda_{si}}{\lambda_{si}+\lambda} z_i u_i}{d^H d - \sum_{i=1}^{p} \frac{\lambda_{si}}{\lambda_{si}+\lambda} |z_i|^2}$$

where
  $z_i$=the $i^{th}$ component of z, and
  $\lambda_{si}$=the $i^{th}$ diagonal component of $\Lambda_s$.
This form only requires the partial singular value decomposition of the data matrix for efficiency. When snapshots are limited, this type of regularization provides stability of the weight estimates.

The calculation in Step 550 of $\lambda$, the Lagrange multiplier of the optimization, used in the white noise gain constraint can be formulated as a Newton type recursion. The secular equation provides:

$$f(\lambda) = w^H(\lambda)w(\lambda) - c = 0; \quad c = \frac{10^{\frac{\beta}{10}}}{d^H d}$$

Because $f(\lambda)$ is a monotone function, a solution is provided as:

$$\lambda_{k+1} = \lambda_k - \frac{f(\lambda_k)}{f'(\lambda_k)}.$$

Letting $$w^H w = \frac{n(\lambda)}{d(\lambda)} = \frac{\sum_{i=1}^{L} \frac{|z_i|^2}{\lambda_i^2}}{\left[\sum_{i=1}^{L} \frac{|z_i|}{\lambda_i}\right]^2}; \quad \lambda_i = \lambda_{si} + \lambda; \quad L = \dim(d),$$

which can be differentiated to yield:

$$f'(\lambda) = \frac{d(\lambda)n'(\lambda) - n(\lambda)d'(\lambda)}{d^2(\lambda)}$$

$$n'(\lambda) = -2\sum_{i=1}^{L} \frac{|z_i|^2}{\lambda_i^3}$$

$$d'(\lambda) = -2n(\lambda)g(\lambda); \quad g(\lambda) = \sum_{i=1}^{L} \frac{|z_i|^2}{\lambda_i}$$

The summations can be converted to sums from 1 to p by using the identity:

$$\sum_{i=1}^{L} |z_i|^2 = d^H d = \sum_{i=1}^{p} |z_i|^2 + \sum_{i=p+1}^{L} |z_i|^2$$

and by noting that $\lambda_i=\lambda$ for $i \geq p$. Note also that $d^H d = L = \dim(d)$ for this particular case but the formula for the adaptive weights is valid even when $d^H d \neq L$. The value of p generally ranges from about 3 to L/2 and is selected to provide a best value for clutter suppression but is strictly less than K, the number of snapshots.

Adaptive weights are then applied in Step 570 to each signal to be used in the summation of the signals in Step 580. The summed signals provide a single signal representing a return from the target object with an improved signal-to-clutter ratio. Thus, the present invention improves the accuracy of locating a target object by improving the signal-to-clutter ratio and maintaining signal gain.

It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

What is claimed is:

1. A signal processing system for adaptively processing signals received by an antenna array and organized into a data matrix that enhances the signal-to-noise ratio of the signals, comprising:
   an antenna array, and
   a signal processor connected to the antenna array including a phase calibration element for correcting phase errors in the received signals using the received signals as a calibration source by locating a delay bin of a direct blast and time aligning the received signals, and an adaptive processing element for calculating adaptive weights from a reduced rank approximation of a factorization of a covariance matrix calculated from a partial singular value decomposition of the data matrix.

2. The system of claim 1, wherein the signal processor further comprises a preprocessing element to down convert the received signals to baseband and match filter the received signals.

3. The system of claim 1, wherein the signal processor further comprises one or more analog to digital converters for converting the signals received by the array antenna.

4. The system of claim 1, wherein the signal processor further comprises multipliers for applying the adaptive weights to the signals.

5. The system of claim 1, wherein the signal processor further comprises a summation element for combining the adaptively weighted signals into a single signal representing the received signals.

6. A method for processing signals received by an antenna array for improving the signal-to-noise ratio of the received signals, comprising the steps of:
   automatically calibrating the phase of the received signals to correct for phase errors in the antenna array by locating a delay bin of a direct blast and time aligning the received signals; and
   adaptively processing the signals.

7. The method of claim 6, wherein the step of automatically calibrating the phase of the received signals further comprises the steps of:
   computing differential phase across the array for each pulse; and
   median filtering across the pulses to eliminate outlying signals.

8. The method of claim 7, wherein the step of automatically calibrating the phase of the received signals further comprises the steps of:
   computing an average differential phase for the received signals;
   subtracting the average differential phase across the received signals to create a resulting phase representing phase errors; and integrating the resulting phase across the received signals to produce phase corrected signals.

9. The method of claim 6, wherein the step of automatically calibrating the phase of the received signals further comprises the step of using the received signals as the calibration source.

10. The method of claim 6, wherein the step of adaptively processing the received signals further comprises the step of transforming the received signals to beamspace.

11. The method of claim 10, wherein the step of adaptively processing the received signals further comprises the step of transforming the received signals to Doppler space.

12. The method of claim 6, wherein the step of adaptively processing the received signals further comprises the step of calculating a steering vector over the array for a specified number of pulses.

13. The method of claim 12, wherein the step of adaptively processing the received signals further comprises the step of calculating a reduced rank approximation of a factorization of the covariance matrix via a partial singular value decomposition of a data matrix.

14. The method of claim 13, wherein the step of adaptively processing the received signals further comprises the steps of:

partitioning the dominant eigenvalues from the covariance matrix;

incorporating the dominant eigenvalues of the covariance matrix;

calculating a beam dependent white noise gain constraint;

calculating the adaptive weights by using the dominant eigenvalues;

applying the adaptive weights to the received signals; and summing the weighted signals.

15. The method of claim 13, wherein the step of adaptively processing the received signals further comprises the steps of:

partitioning the singular values of the data matrix;

calculating a beam dependent white noise gain constraint;

calculating the adaptive weights by using the singular values applying the adaptive weights to the received signals; and summing the weighted signals.

16. The method of claim 6, further comprising the step of preprocessing the received signals.

17. The method of claim 16, wherein the step of preprocessing the received signals comprises the steps of:

down converting the received signals to baseband; and match filtering the converted received signals.

18. The method of claim 6, further comprising the step of creating a data matrix from snapshots of the received signals over time.

19. The method of claim 6, wherein the step of adaptively processing the received signals further comprises the step of calculating adaptive weights without calculating a noise floor.

* * * * *